US007571788B2

(12) United States Patent
Barnard

(10) Patent No.: US 7,571,788 B2
(45) Date of Patent: Aug. 11, 2009

(54) PANEL MOUNT CABLE CONTROL ASSEMBLY

(75) Inventor: Michael A. Barnard, Wichita, KS (US)

(73) Assignee: Wescon Products Company, Wichita, KS (US)

( * ) Notice: Subject to any disclaimer, the term of this patent is extended or adjusted under 35 U.S.C. 154(b) by 526 days.

(21) Appl. No.: 11/362,474

(22) Filed: Feb. 24, 2006

(65) Prior Publication Data

US 2007/0199762 A1 Aug. 30, 2007

(51) Int. Cl.
*B60K 13/00* (2006.01)

(52) U.S. Cl. ........................ 180/335; 74/491; 74/500.5; 74/504; 180/332; 180/333; 180/336

(58) Field of Classification Search ................. 180/335, 180/336, 334, 333, 332, 315; 74/491, 500.5, 74/501.6, 502, 504, 502.2
See application file for complete search history.

(56) References Cited

U.S. PATENT DOCUMENTS 2,502,299 A * 3/1950 Wood et al. .................... 74/565
4,591,017 A * 5/1986 Enjo et al. .................. 180/205
4,919,004 A * 4/1990 Nagano ................... 74/473.13
5,044,213 A * 9/1991 Nagano ....................... 74/142
5,361,645 A * 11/1994 Feng et al. ................. 74/502.2
6,070,487 A 6/2000 Beugelsdyk et al.

FOREIGN PATENT DOCUMENTS

FR 2657062 * 7/1991

* cited by examiner

*Primary Examiner*—Eric Culbreth
(74) *Attorney, Agent, or Firm*—Hovey Williams LLP

(57) ABSTRACT

A panel mount cable control assembly is provided which is useful with a vehicle having controllable mechanisms such as a throttle and choke of an internal combustion engine. The cable control assembly includes independently actuated shifters operatively connected to respective Bowden cables connected to the controllable mechanisms, which each shifter having a different mode of operation. A first shifter is preferably maintained in a desired position through frictional engagement, while a second shifter operates for a free return though a spring which biases the shifter to an initial position. Both shifters are preferably mounted to substantially enclose a chamber of a housing, and are positioned for side-by-side independent pivotal movement with the shifters in abutment.

18 Claims, 5 Drawing Sheets

PANEL MOUNT CABLE CONTROL ASSEMBLY

BACKGROUND OF THE INVENTION

1. Field of the Invention

The present invention relates generally to cable control devices and more particularly, to a cable control assembly which is designed for mounting in a control panel of a tractor or other powered machine and for operating a pair of control cables connected to a remotely controlled engine or other mechanism.

2. Description of the Prior Art

The use of shiftable controls for operating control cables of equipment is well known in the art in connection with lawnmowers, snow blowers, tillers, tractors and other utility equipment. Such equipment typically includes an engine throttle, choke as well as a variety of other controllable devices such as blades, transmissions, ground drive units, power take-offs and the like. It is also known to mount cable controls in openings in control panels.

More recently, the ability to provide a control cable assembly as a snap-in unit has developed as a desired option. One such unit is shown, for example, in U.S. Pat. No. 6,070,487, the disclosure of which is incorporated herein by reference. That control, and others like it, operate using a housing which substantially encloses a detent mechanism to which a shiftable lever is attached. The cable control assembly of the U.S. Pat. No. 6,070,487 patent is advantageous, in that it can be mounted for positive or negative action, requires fewer parts, can be held at several positions because of the use of a detent spring, and is easily attached to the control panel of the equipment.

However, the panel-mount cable control assembly of the U.S. Pat. No. 6,070,487 patent has several limitations necessitated by the advantages it presents. It and other panel mount control assemblies are often limited to the control of only a single cable. Moreover, the provision of different functions for several lever controls is not contemplated. Finally, the ability to provide smooth functioning over a continuous operating range is limited by the use of the detent spring.

Thus, a need has developed for a different panel mount cable control assembly which affords the operator different operating characteristics, while still providing an economy of parts and simplicity in the assembly.

SUMMARY OF THE INVENTION

These and other objects are largely met by the panel mount cable control assembly hereof. The assembly of the present invention differs markedly in internal structure from the prior art and provides smooth functioning over a wide range of motion, while being able to retain the control lever and the control cable to which it is connected in position during operation. The control cable assemblies hereof, moreover, provide enclosed housings which snap-fit into an opening in a control panel to control noise and protect the operation of the cable control assembly from an accumulation of dust or other foreign matter. The control lever of the assembly is part of a self-contained unit which greatly simplifies installation. Preferably, a control lever within the housing is provided with a spring operatively connecting the lever to the housing which provides self-return movement while enjoying the protection and ease of assembly and installation when installed in a control panel. As an alternative preferred embodiment, the control lever may be shifted at any location within a range of motion and held by a friction assembly, while retaining the benefits of an enclosed housing and snap-in installation.

Moreover, in its most preferred embodiments, the present panel mount cable control provides a compact assembly with two different control levers having completely different functioning characteristics, where one lever is useful for gradual adjustments and maintaining the control in position once the operator's hand is removed, while another lever is provided with a return spring whereby the lever returns to a position during normal operation once the operator's hand discontinues applying a force to overcome the return spring. A principle benefit of the present invention lies in the structural arrangement which provides for ease of assembly as well as protection of the moving components within a housing for the cable control assembly.

Broadly speaking, the panel mount cable control assembly hereof includes a case which is provided in mating, connectable first and second casing portions, at least a first and preferably a second shifter pivotally mounted in the case and having respective levers extending from the case, a control cable operatively connected for shifting responsively with movement of the shifter, or each of the first and second shifters when two shifters are used, and a mounting assembly which includes mounts for pivotal movement of each of the first and second shifters independently. Preferably, the cable control assembly includes a return spring connected to one of the shifters for biasing that shifter to a primary position, the spring being preferably operatively connected to the shifter and the housing whereby the spring is internal to the housing. This arrangement is especially convenient and useful when that shifter is used to control a mechanism which has only a temporary use during a limited time of operation, such as a choke used in starting an internal combustion engine. The other shifter is preferably a position-retaining shifter, such as one held in place by a friction assembly, which may be used to control a mechanism such as a throttle, which is shifted to a position and held there during operation of the equipment or moved to various positions for changing the operating conditions such as engine speed during use.

The preferred mounting assembly is particularly useful in the control cable assembly hereof where each of the levers are mounted side by side but have very different modes of operation. Most preferably, the shifters pivot about a common pivot axis extending along a threaded fastener connecting two halves of the case, but each of the first and second shifters may be carried by and retained with a respective half of the case when the halves are separated. The first shifter, which preferably is held by the mounting assembly so that it is retained in position when released, may be held by a spring washer and at least one friction washer, and most preferably includes two separate retainers which resist rotation relative to the casing so as to limit pivotal travel of the shifter. The second shifter is preferably mounted for pivotal movement about a stem which presents a pivot axis coincident with the threaded fastener, and is provided with a post to which a screw or other threaded fastener may be inserted for providing an attachment point for the return spring. The second shifter preferably includes stops which limit the travel of the shifter, and thus the control cable to which it is attached, to a desired range of motion. The return spring is positioned within and protected by the casing and the shifters to inhibit the entry of debris into the interior of the casing and which might interfere with the operation of the return spring.

By providing the two shifters within a common casing, not only may space and expense be economized, but also the operation of both levers by one hand of the operator may be effected. The structure of the mounting assembly is particularly advantageous in permitting each shifter to operate independently and one with friction retention and the other with free return and a spring to bias the lever to a primary position.

DESCRIPTION OF THE PREFERRED EMBODIMENT

Figure 1:
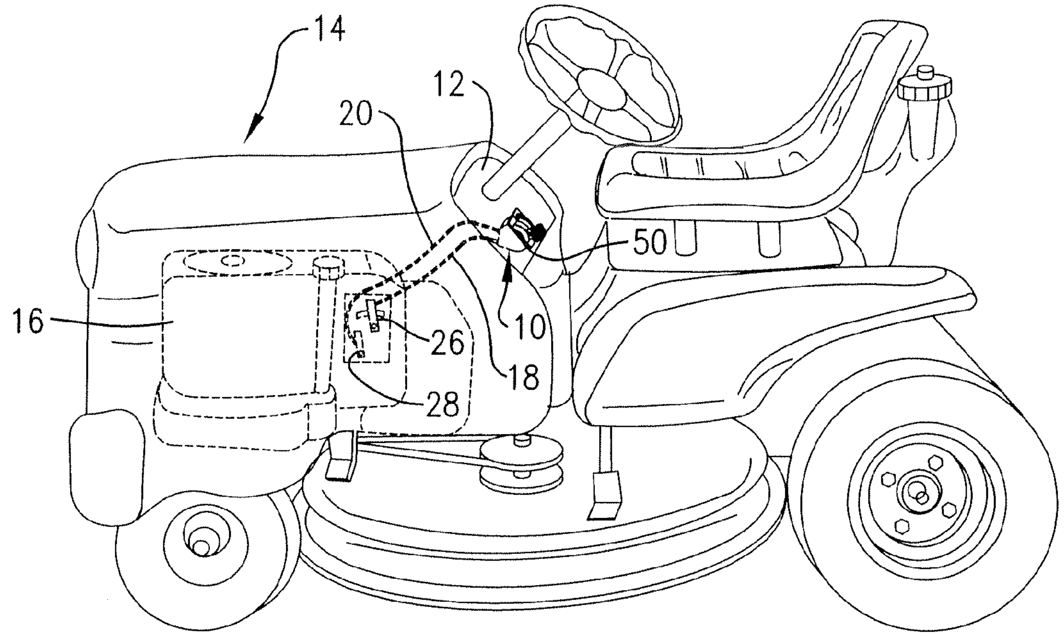
FIG. 1 is a perspective view of a tractor with an internal combustion engine with the panel mount cable control assembly hereof received in the control panel of the tractor.
Figure 2:
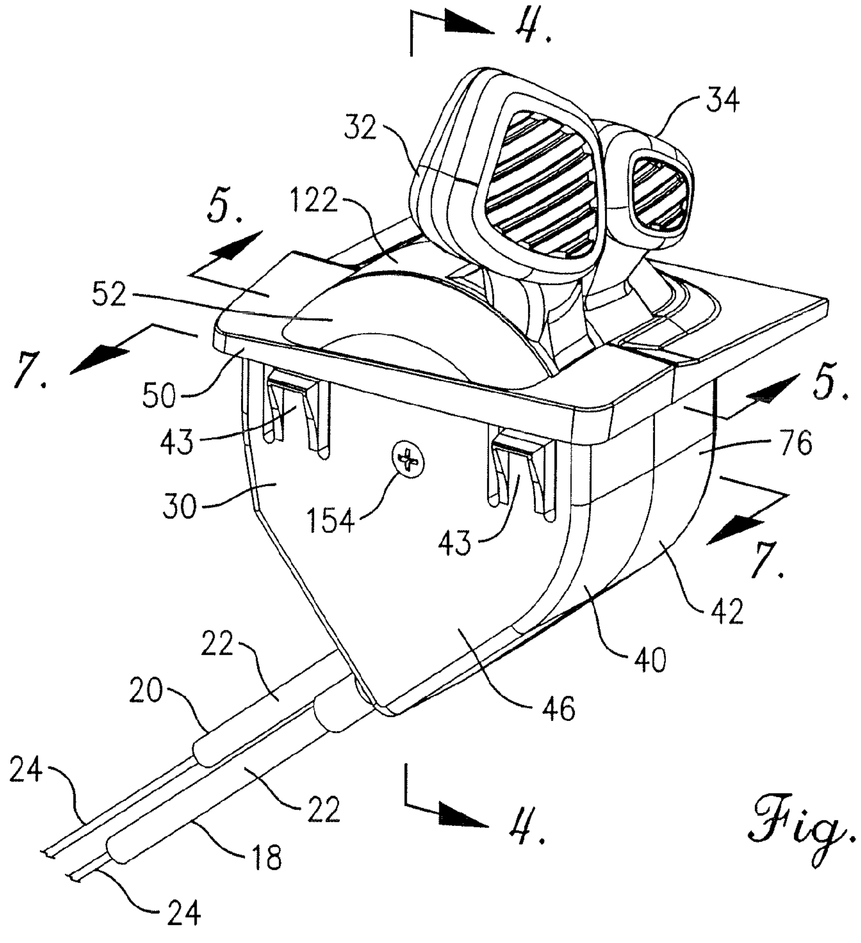
FIG. 2 is a perspective view of the panel mount cable control assembly showing the case, shifters and control cables.

Referring now to the drawing, a panel mount cable control assembly 10 in accordance with the present invention is shown in an assembled condition in FIG. 2 and installed in a control panel 12 of a vehicle 14 such as a garden tractor. While the invention hereof is particularly useful in controlling an internal combustion engine 16 of the tractor as illustrated in FIG. 1, it may be appreciated that its utility is not limited to installation in tractors, but may extend to other vehicles including, for example, lawn mowers, snow throwers, snowmobiles or other controllable vehicles. In the preferred application of the panel mount cable control assembly 10 illustrated in FIG. 1, first and second Bowden cables 18 and 20, each having a sheath 22 and a control cable 24 operatively connect the panel mount cable control assembly 10 to controllable mechanisms such as a choke and a throttle of the engine 16. The first Bowden cable 18 in the present application operatively connects the panel mount cable control assembly 10 to the throttle 26 of the engine 16, while the second Bowden cable 20 operatively connects the panel mount cable control assembly 10 to the choke 28 of the engine 16. It may be appreciated that while this is the preferred application of the present invention, other controllable mechanisms such as a power take-off, ground drive mechanism, blade brake or the like could be controlled by the panel mount cable control assembly 10 hereof.

In greater detail, the panel mount cable control assembly illustrated in FIGS. 2 through 6 broadly includes a housing 30, a first shifter 32 and a second shifter 34 corresponding and respectively connected to the first Bowden cable 18 and the second Bowden cable 20, and a mounting assembly 36. The housing 30 is preferably configured for snap-in installation into the control panel 12 and together with the shifters 32 and 34 defines and substantially encloses an internal chamber 38 so as to protect the mounting assembly from intrusion by insects, dirt and other items which may interfere with or degrade the operation of the control assembly 10, and further inhibits the passage of sound through the opening in the control panel 12 provided for its receipt, such blockage being beneficial to the hearing of the user.

Figure 3:
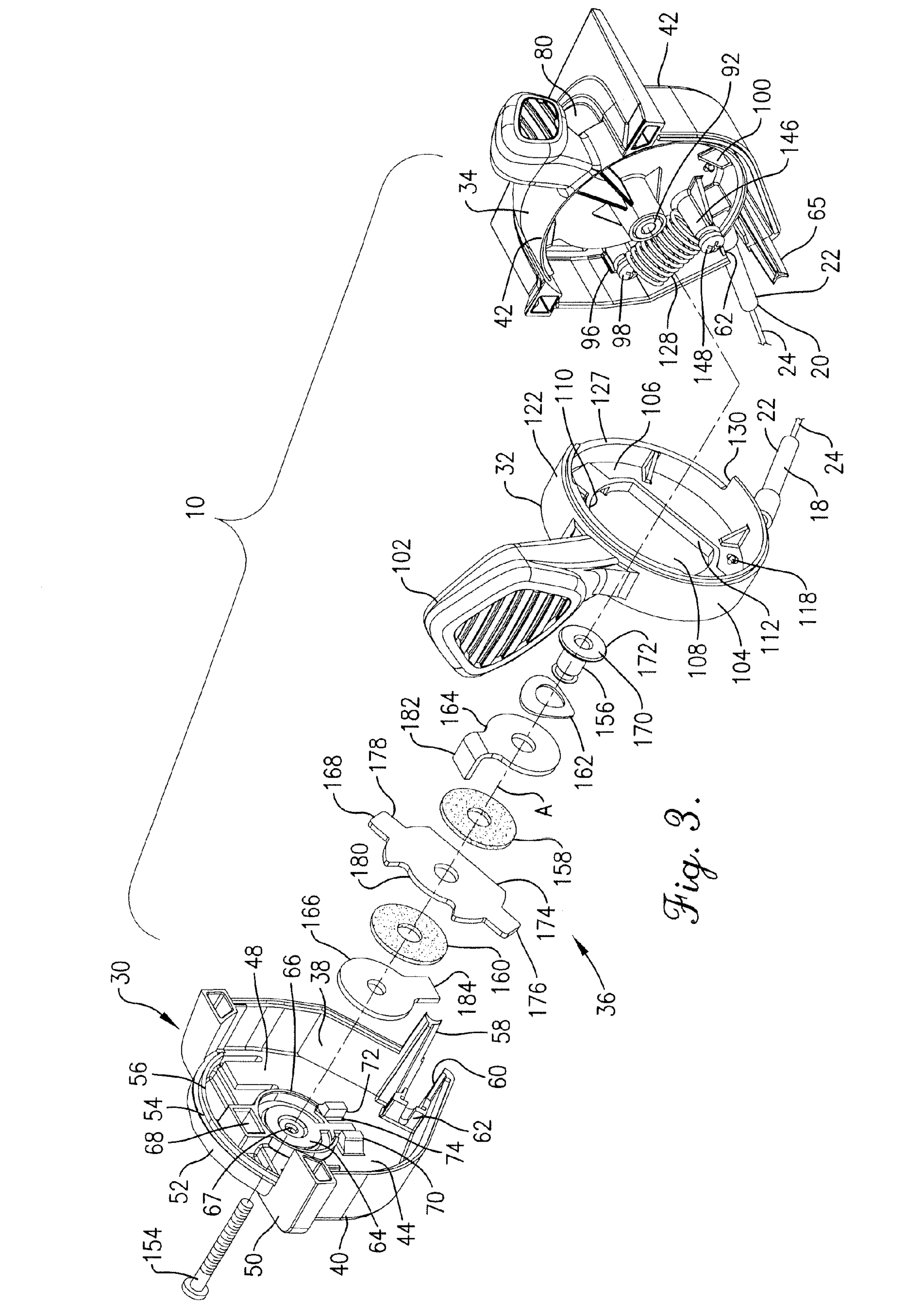
FIG. 3 is an exploded view of the panel mount cable control assembly hereof.

As shown in FIG. 3, the housing 30 is molded of synthetic resin and includes a first housing half 40 and a second housing half 42 which are complementally configured to fit together in opposing relationship. A threaded fastener 154 holds the two housing halves together. It is to be understood that "housing half" is not meant to mean that either housing half is ½ of the material, surface area or equal in configuration, but merely that the two housing halves generally make up the housing 30. The housing 30 is preferably molded of resilient synthetic resin and incorporates the snap-fit structure as shown in U.S. Pat. No. 6,070,487. This preferably includes a plurality of integrally formed snaps 43 in each housing half which are permitted to move inwardly into the housing and outwardly. A slit surrounds each snap 43, which has an arm connected to the remainder of the housing and a projection. First housing half 40 includes a first wall 44 having an outer surface 46, and an inner surface 48. Furthermore, the wall 44 includes an outwardly projecting circumscribing rim 50 extending generally laterally when mounted and which rests upon the control panel 12, the portion of the wall 44 generally above the rim 50 including a generally arcuate or half-dome shape 52 with an inner edge 54 having an inwardly projecting arcuate-shaped lip 56. The snaps 43 are formed in the first wall 44 and serve to hold the control panel 12 between the rim and the snaps 43. The first wall 44 also includes a projection 58 and a notch 60 and a clip 62 having a slot for receiving and holding the sheath 22 of the first Bowden cable 18. The projection 58 is sized and adapted to fit into a corresponding notch 60 in the second housing half 42 and the notch 60 receives a corresponding projection 65 extending inwardly from the second housing half 42. The first wall 44 includes a central hole 67 which defines a pivot axis A which most preferably is both a first pivot axis for the first shifter 32 and a second pivot axis for the second shifter 34, with the inner surface 48 presenting a generally disc-shaped boss 64, an arcuate ridge 66, structure defining a recess 68 positioned above the hole 62 and radially outward of the ridge 66, and first and second lugs 70 and 72 extending into said chamber in spaced, preferably below the hole 62 and diametrically opposed, relationship to said recess, said lugs 70 and 72 presenting a gap 74 therebetween.

The second housing half 42 includes a second wall 76 with an outwardly projecting circumscribing rim 78 positioned substantially co-planar with the rim 50 of the first housing half 40 when the housing halves are mated. The portion of the second housing half 42 extending above the rim 78 includes a generally arcuate or half-dome shape 80 with an inner edge 82 which is opposed to the inner edge 54 of the first wall 44 and includes an inwardly projecting arcuate-shaped lip 84. The second wall 76 includes the resilient snaps 43 therein, and also has an inner surface 86 and an outer surface 88, and includes a clip 90 adjacent the notch 62 having a slot for holding the second Bowden cable 20. The second wall 76 includes a central spindle 92, best seen in FIG. 4, which is configured for pivotally receiving the second shifter 34 thereon and which includes a bore 94 positioned in alignment with the hole 62. The wall 76 also presents a stub 96 which threadably receives a set screw 98 therein. An inwardly projecting limiting shoulder 100 extends inwardly toward the first housing half 40.

Figure 4:
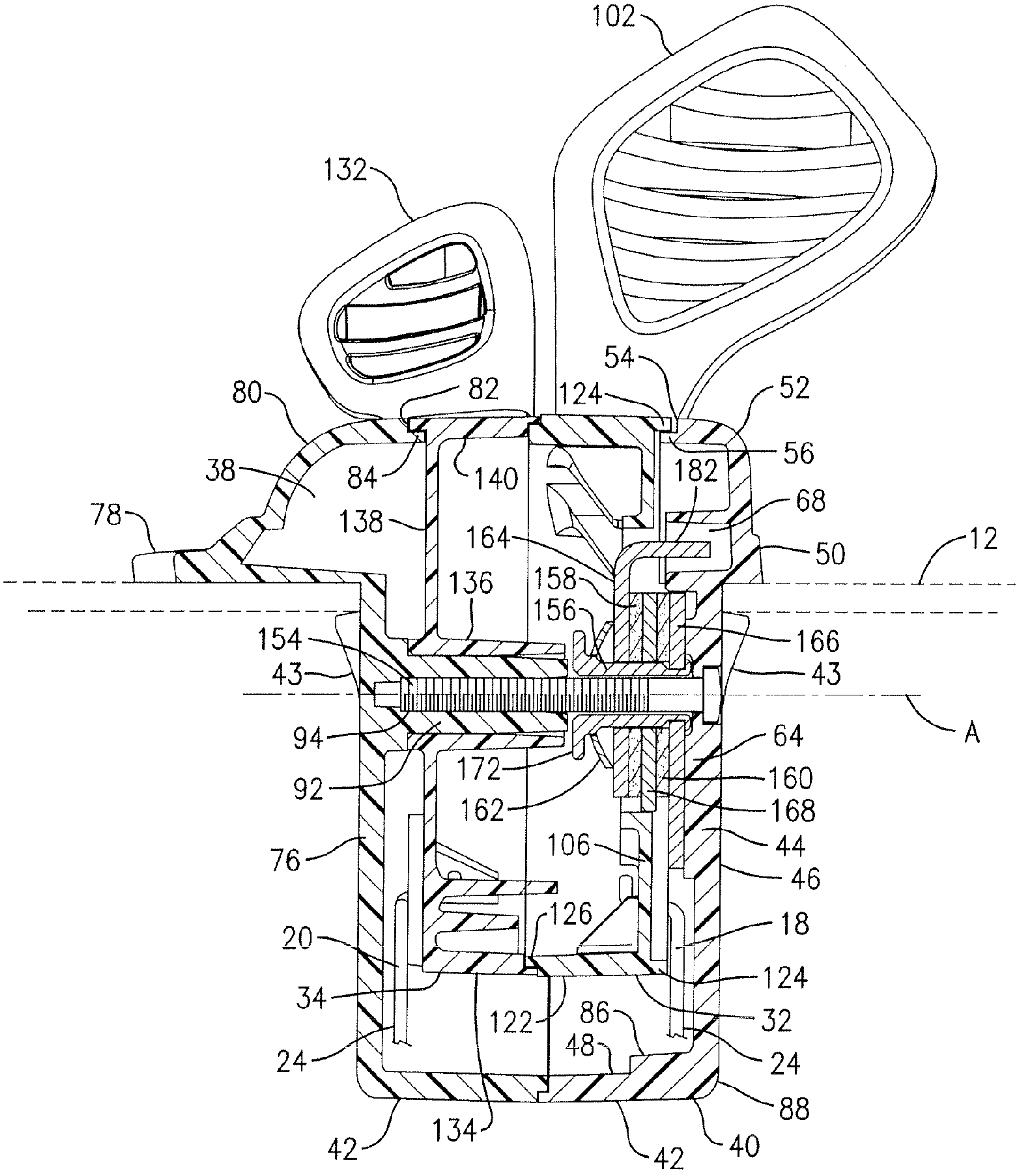
FIG. 4 is a vertical cross-sectional view of the panel mount cable control assembly hereof taken along line 4-4 of FIG. 2, showing the shifters and mounting assembly, but with the return spring removed for clarity.
Figure 7:
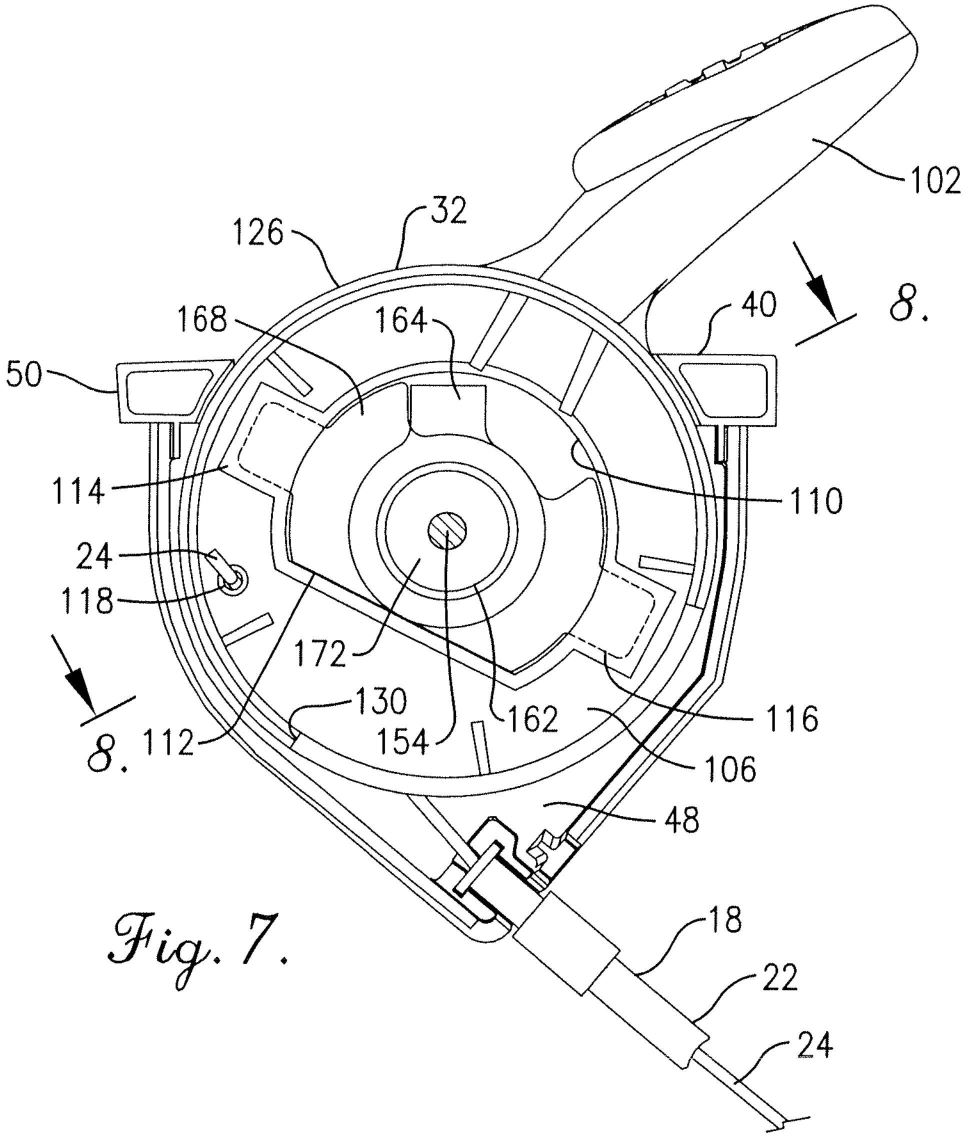
FIG. 7 is a vertical cross-sectional view taken along line 7-7 of FIG. 2, showing the first shifter in an initial position with the retainer, spring washer and part of the carrier plate visible through the sector opening of the first shifter.
Figure 8:
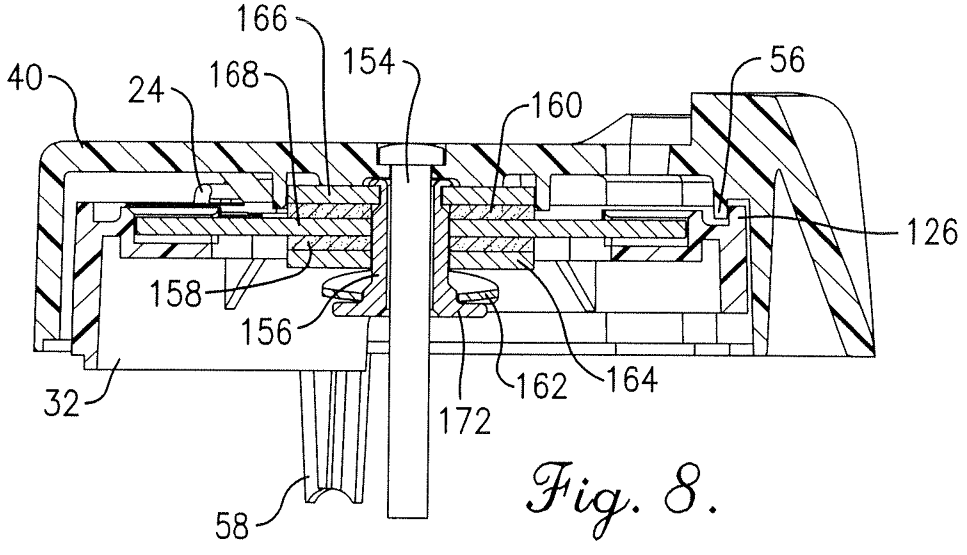
FIG. 8 is a cross-sectional view taken along line 8-8 showing the left case half and shifter with the mounting assembly portion therefor, including the spring washer and friction washers, and retainer.

The first shifter 32 is integrally molded of synthetic resin and includes a handle 102 and an arcuate hub 104 which is preferably generally circular. The handle 102 projects radially from the hub. The hub 104 includes a hub wall 106 having a central opening 108 which includes an arcuate edge 110 and a flat edge 112. Two opposed, diametrically spaced recesses 114 and 116, best seen in phantom lines in FIG. 7 are provided in the hub wall 106. The hub wall 106 also includes a hole 118 which receives the proximate end 120 of the control cable 24 of the first Bowden cable 18. As may be seen in FIG. 3, the hub 104 includes a circumferentially extending arcuate guide wall 122 radially outward of the hub wall 106. The guide wall 122 includes an arcuate rail 124 which rides on the lip 56 as seen in FIG. 4, and a inwardly oriented circular shoulder 126 which cooperates with the second shifter 34 so that the first and second shifters are able to pivot about the axis A without relative radial movement but permitting relative circumferential movement. The guide wall 122 includes a relieved sector 127 which provides clearance for operation of a return spring 128 mounted to the stub 96 and a forward edge 130 thereof may limit rearward or clockwise (as viewed in FIG. 2) pivoting of the first shifter 32 as a result of engagement of the forward edge 130 with the stub 96.

Figure 6:
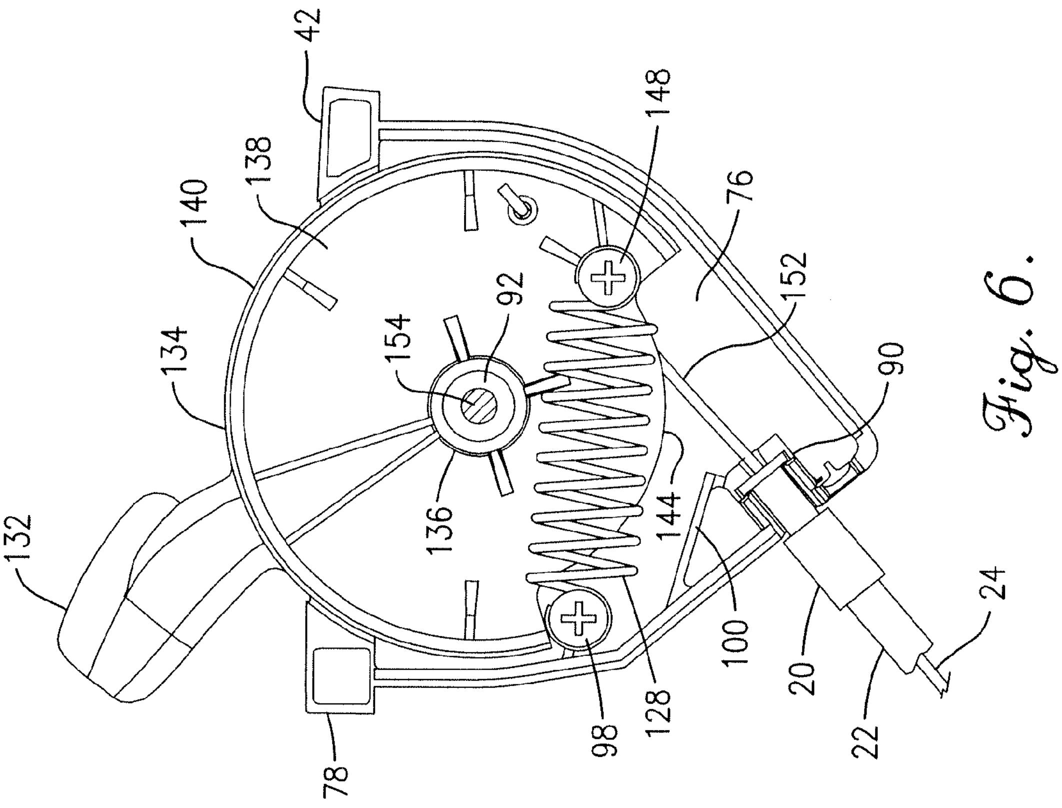
FIG. 6 is a vertical cross-sectional view taken along line 5-5 of FIG. 2 and similar to FIG. 5, but with the second shifter in an advanced position.
Figure 5:
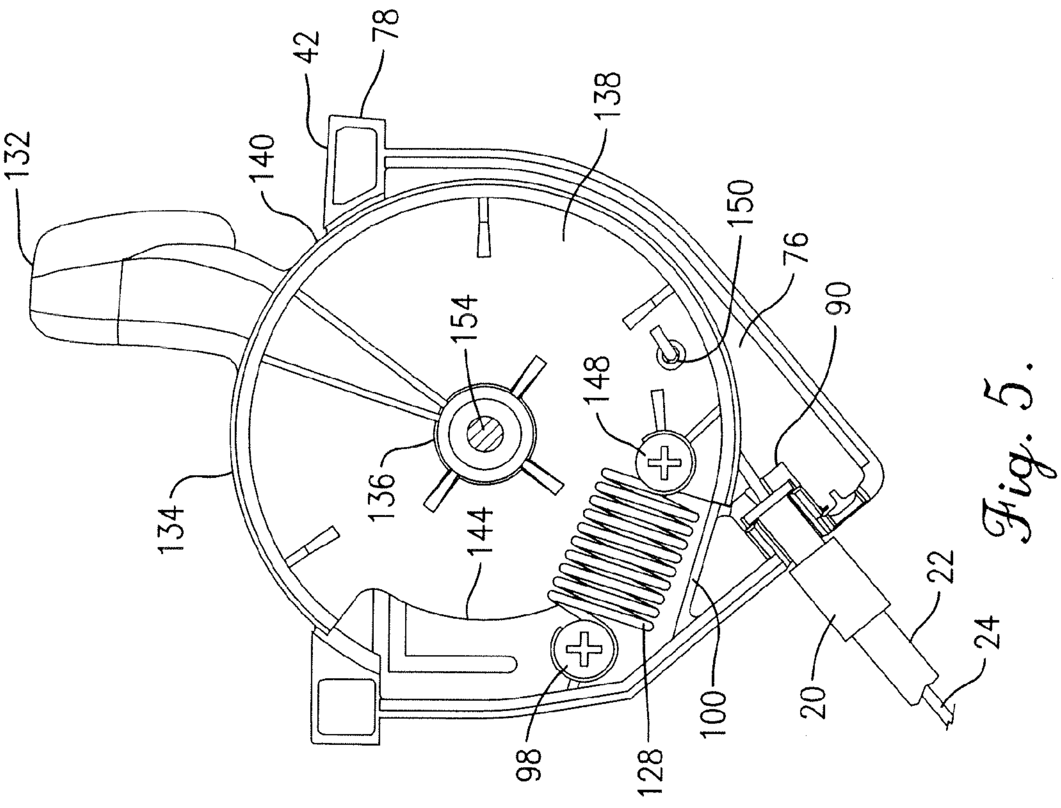
FIG. 5 is a vertical cross-sectional view taken along line 5-5 of FIG. 2, showing the second shifter and return spring within the housing, with the second shifter in its primary position.

The second shifter 34 is shown in FIG. 3 and is also integrally molded of synthetic resin and includes a radially projecting handle 132 and an arcuate hub 134 which includes a central bearing 136 for pivotal movement about the spindle 92. As better seen in FIGS. 5 and 6, the arcuate hub 134 includes a hub wall 138 extending radially outwardly from the central bearing 136 to a guide wall 140. The guide wall 140 is substantially circular, having an arcuate rail 142 which rides on the lip 84 as seen in FIG. 4, and an inwardly oriented circular flange which cooperates with the circular shoulder 126 of the first shifter 32 as described above. While the guide wall 140 is substantially circular, a limit sector 144 on both the guide wall 140 and the hub wall 138 is presented. The limit sector 144 presents a cut-out area on both the guide wall 140 and the hub wall 138 to thereby accommodate the stub 96 and the limiting shoulder 100. Further, the engagement of the limit sector 144 of the hub wall 138 with the stub 96 and the limiting shoulder 100 serves to limit the pivotal travel of the second shifter as shown by FIGS. 5 and 6. The hub wall 138 further includes a peg 146 which receives a screw 148 or other threaded fastener therein, and a hole 150 for permitting coupling of the second shifter 34 to the proximate end 152 of the control cable 24 of the second Bowden cable 20.

The mounting assembly 36 as shown in FIGS. 3, 4, 7 and 8 is secured in position by the combination of the shifters, the housing, and a threaded fastener 154 which is inserted through the hole 62 and threaded into the bore 94 of the spindle 92. The mounting assembly 36 preferably includes a bearing 156, first and second friction washers 158 and 160, spring washer 162, first and second shifter keys 164 and 166, and shifter mount plate 168. In greater detail, the bearing 156 is tubular having a central passageway 170 to receive the threaded fastener 154 therethrough. The bearing 156 receives the friction washers, spring washer, shifter keys and shifter mount plate thereon and its flange 172 serves as a backing against which a force may be applied by the spring washer 162. The first friction washer 158 and the second friction washer 160 receive the shifter mount plate 168 therebetween and apply a frictional force to hold the first shifter 32 in position when manually moved thereto. The shifter mount plate 168 is at least partially received within the central opening 108 of the first shifter and includes a bottom edge 174 which engages the flat edge 112 so that the shifter mount plate 168 pivots with the first shifter 32. The shifter mount plate further includes two spaced apart ears 176 and 178 which are sized and positioned for fitting within recesses 114 and 116. The shifter mount plate 168 also includes a relieved portion 180 which permits a flange 182 of the first shifter key 164 to fit into the recess 68 so that the recess 68 retains and inhibits rotational movement of the first shifter key, the part of the shifter mount plate 168 on either side of the relieved portion 180 also acting as a limit to stop excessive pivotal movement of the first shifter 32 when the flange 182 engages the shifter mount plate 168 at the ends of its forward and rearward pivotal movement. The second shifter key 166 includes an arm 184 which fits into the gap 74 between the lugs 70 and 72 to thereby retain and inhibit rotational movement of the second shifter key 166. Thus, the shifter keys 164 and 166 are designed to remain stationary relative to the housing 30 during pivotal movement of the first shifter 32, while the shifter mount plate 168 moves with the first shifter 32 during its pivotal travel. The action of the spring washer against the first shifter key 164 acts with the friction washers to hold the first shifter 32 in its desired position during operation of the vehicle. The spindle 92 is a part of the mounting assembly 36, although formed with the second housing half 42, and with the spring 128 serves to mount the central bearing 136 of the second shifter 34 in its desired position for pivotal movement.

The panel mount cable control assembly 10 is assembled according to FIGS. 3, 4, 5, 6 7 and 8 whereby the second shifter 34 is mounted on the second housing half 42 as shown and biased by the return spring 128 to a rearward or clockwise position as seen in FIG. 3, with the control cable 24 thus initially in a retracted condition. The bearing 136 is configured relatively loosely about the spindle 92 so that the second shifter 34 would freely pivot but for the operative action of the spring 128. In contrast, the assembly of the first shifter 32 operates by friction for holding the first shifter in a desired position and overcoming friction for movement of the shifter and the control cable 24 of the first Bowden cable 18. Thus, the two shifters have independent mounting mechanisms and operate in entirely different manners. After assembly of the panel mount cable control assembly 10, it is inserted into an opening in the control panel of the vehicle and the control cables 24 of each of the first and second Bowden cables 18 and 20 are operatively connected to controllable devices, most preferably a throttle and a choke of an internal combustion engine as illustrated in FIG. 1, but alternatively may be used to control other controllable mechanisms such as gear change mechanisms.

In operation, the panel mount cable control assembly 10 in the disclosed application of FIG. 1 operates wherein the operation moves the handle of the first shifter 32 forwardly as illustrated in FIGS. 1 and 2 to provide a full throttle, the friction washers holding the shifter 32 in the forward, full-throttle position. Then, the operator may move the handle of the second shifter 34 forwardly also as illustrated in FIGS. 1 and 2. Here, however, the second shifter 34 must be held manually in the forward position to actuate the choke, or else the return spring will return the shifter and the control cable to which it is attached to the rear position wherein the choke is not actuated. When the engine engages, the operator may release the handle of the second shifter 34 whereupon the spring operates to return the second shifter and the control cable 24 to which it is attached to the initial position. Because the second shifter is then in a "free-return" mode and biased to the initial position, the action of the spring 128 acting through the second shifter 34 and the control cable 24 of the second Bowden cable 20, the choke or other actuated mechanism returns to its unactuated condition. However, because the second shifter 34 is mounted and operates separately and in a separate mode than the first shifter 32, the first shifter 32 is retained in the position to which it is moved by the operator by the friction action of the spring washer 162 and the friction washers 158 and 160 against the plate 168 which is operatively connected to the first shifter 32. Thus, the first shifter 32 and the control cable 24 of the first Bowden cable 18 remain in the selected position between a rearward position shown in FIG. 2 and a forward position shown in FIG. 7 until manually shifted by the operator.

As a result, the operation of the vehicle 14 is greatly facilitated. In the instance where the panel mount control cable 10 is used in a lawn tractor, the operator can move the first shifter 32 to the forward position illustrated in FIG. 7 where it is retained to open the throttle by the action of the first Bowden cable 18, and hold the second shifter 34 forward to engage the choke, leaving the other hand free to perform other tasks. Then, when the engine starts, the operator may release the second shifter 34 which automatically disengages the choke through the free-return action to its initial position for smooth and full-power operation of the engine. The first shifter 32 is held in its selected position anywhere through a full range of settings between the forward and normally full-throttle position and the rearward or low-throttle position, the frictional engagement of the mounting assembly serve to hold the throttle in its selected position which can be selected throughout the range of motion of the first shifter. The housing, shifters and mounting assembly provide redundant supports and limits for the movement of the shifters to provide greater durability and prolong the useful life of the shifter. The smooth action provided between the housing 32 and each of the shifters 32 and 34 which are held in place both centrally and along their outer arcuate hubs facilitates longevity and maintains smooth operation. Moreover, the construction of the housing and the placement of two shifters in a single control not only reduces material expenses and labor, but requires only a single panel opening to receive two operating shifters, thereby limiting the amount of debris and noise which can pass through the panel and enter the control or reach the operator.

Although preferred forms of the invention have been described above, it is to be recognized that such disclosure is by way of illustration only, and should not be utilized in a limiting sense in interpreting the scope of the present invention. In this regard, it is to be understood that the panel mount cable control assembly hereof may be provided with only one shifter, either the first shifter 32 having the self-return spring which is mounted internally to the housing 30, or the second shifter 34 which retains its position within its range of motion by friction or other means. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. A panel mount cable control assembly comprising:

a housing presenting an internal chamber;

a first shifter mounted for pivotal movement relative to said housing about a pivot axis, said first shifter including a first hub member located at least partially within said internal chamber and a first lever extending from the first hub member outwardly of the internal chamber;

a second shifter mounted for pivotal movement relative to said housing, said second shifter including a second hub member located at least partially within said internal chamber and a second lever extending from the second hub member outwardly of the internal chamber;

a mounting assembly located in said internal chamber and mounting at least said first shifter, said mounting assembly including a friction assembly for resisting pivoting movement of said first shifter relative to said housing; and a spring mounted within said internal chamber and substantially enclosed by said first and second shifters and said housing, wherein said spring operatively connects said housing and said second shifter and applies a biasing force in a direction transverse to the second pivot axis for applying a pivoting force to said second shifter, said second shifter being pivotal between a primary position and an alternative position, and whereby said spring is operative to pivot said second shifter from the alternative position to the primary position in the absence of an external force.

2. A panel mount cable control assembly as set forth in claim 1, wherein said mounting assembly includes a spindle extending inwardly from said housing parallel to and aligned with said pivot axis, and wherein the hub member of said second shifter includes a hub mounted for pivoting about said spindle.

3. A panel mount cable control assembly as set forth in claim 1, wherein said mounting assembly is located in said internal chamber and wherein said friction assembly includes a shifter mount plate which includes a projection extending transverse to the first pivot axis and wherein said first shifter further includes at least one recess complementally configured to receive said projection.

4. A panel mount cable control assembly as set forth in claim 3, wherein said shifter mount plate is complementally configured with said first shifter for complementary pivotal movement when said first shifter is pivoted said friction assembly further including, a friction element, a biasing member operative for exerting a biasing force between said friction element and said shifter mount plate in a direction parallel to said pivot axis, and a shifter key for engaging said housing and resisting rotational movement of said friction assembly during pivoting of said shifter.

5. A panel mount cable control assembly comprising:

a housing presenting an internal chamber;

a first shifter mounted for pivotal movement relative to said housing about a pivot axis, said first shifter including a first hub member located substantially within said internal chamber and a first lever extending from the first hub member outwardly of the internal chamber;

a second shifter mounted for pivotal movement relative to said housing, said second shifter including a second hub member located substantially within said internal chamber and a second lever extending from the second hub member outwardly of the internal chamber;

a mounting assembly located in said internal chamber and mounting at least said first shifter; and a spring mounted within said internal chamber and substantially enclosed by said first and second shifters and said housing, wherein said spring operatively connects said housing and said second shifter and applies a biasing force in a direction transverse to the pivot axis for applying a pivoting force to said second shifter, wherein said first hub member and said second hub member include arcuate, side-by-side engagement walls, and wherein said housing includes opposed bearing edges for guiding the engagement walls of said respective first and second hub members during respective pivotal movement of the shifters.

6. A panel mount cable control assembly as set forth in claim 5, wherein said first hub member includes at least one of an arcuate rail and arcuate recess and said second hub member includes another of an arcuate rail and arcuate recess which is cooperatively configured with the one of the arcuate rails and arcuate recess for guiding and maintaining side-by-side alignment of the first hub member and second hub member during relative pivotal movement between the first shifter and the second shifter.

7. A vehicle including an internal combustion engine, including a panel mount cable control assembly comprising:

a housing presenting an internal chamber;

a first shifter mounted for pivotal movement relative to said housing about a pivot axis, said first shifter including a first hub member located substantially within said internal chamber and a first lever extending from the first hub member outwardly of the internal chamber;

a second shifter mounted for pivotal movement relative to said housing, said second shifter including a second hub member located substantially within said internal chamber and a second lever extending from the second hub member outwardly of the internal chamber;

a mounting assembly located in said internal chamber and mounting at least said first shifter;

a spring mounted within said internal chamber and substantially enclosed by said first and second shifters and said housing, wherein said spring operatively connects said housing and said second shifter and applies a biasing force in a direction transverse to the pivot axis for applying a pivoting force to said second shifter; and first and second control cables respectively coupled to said first and second shifters, wherein said housing is mounted to said vehicle and said first and second control cables are operatively connected to the internal combustion engine.

8. A panel mount cable control assembly comprising:

a housing presenting opposed first and second housing halves defining an internal chamber;

a first shifter mounted for pivotal movement relative to said housing about a pivot axis, said first shifter including a first hub member located at least partially within said internal chamber and a first lever extending from the first hub member outwardly of the internal chamber;

a second shifter mounted for pivotal movement relative to said housing about said pivot axis, said second shifter including a second hub member located at least partially within said internal chamber and a second lever extending from the second hub member outwardly of the internal chamber; and a mounting assembly located in said internal chamber and mounting said first shifter for pivotal movement relative to said housing, said mounting assembly including a friction assembly mounted to said first housing half, said friction assembly having a shifter mount plate complementally configured to engage said first shifter and pivot therewith, at least one friction element operatively connected by a bearing to at least one biasing element applying an axial biasing force between the friction element and the shifter mount plate for inhibiting free pivoting of said first shifter and retaining the first shifter in a selected position, the second shifter being mounted to said housing separately from said friction assembly for pivoting relative to said housing.

9. A panel mount cable control assembly as set forth in claim 8, wherein said mounting assembly includes a tubular spindle extending inwardly from said housing along said pivot axis, and wherein said second shifter includes a second bearing mounted for pivoting about said tubular spindle, and further including a fastener extending through said tubular spindle.

10. A panel mount cable control assembly as set forth in claim 9, including a spring mounted to said second housing half within said internal chamber, wherein said spring operatively connects said housing and said second shifter and applies a biasing force in a direction transverse to the second pivot axis for applying a pivoting force to said second shifter.

11. A panel mount cable control assembly comprising:

a housing presenting opposed first and second housing halves defining an internal chamber;

a first shifter mounted for pivotal movement relative to said housing about a first pivot axis, said first shifter including a first hub member located at least partially within said internal chamber and a first lever extending from the first hub member outwardly of the internal chamber;

a second shifter mounted for pivotal movement relative to said housing about a second pivot axis, said second shifter including a second hub member located at least partially within said internal chamber and a second lever extending from the second hub member outwardly of the internal chamber; and a mounting assembly located in said internal chamber and mounting said first shifter for pivotal movement relative to said housing, said mounting assembly including a friction assembly mounted to said first housing half, said friction assembly having at least one friction element and at least one biasing element for inhibiting free pivoting of said first shifter and retaining the first shifter in a selected position, said second shifter being mounted to said housing separately from said friction assembly for pivoting relative to said housing, wherein said first hub member and said second hub member include respective arcuate, side-by-side guide walls, and wherein said housing includes opposed edges for guiding the guide walls of the respective first and second hub members during pivotal movement of the shifters.

12. A panel mount cable control assembly as set forth in claim 11, wherein said guide wall of said first hub member includes at least one of an arcuate rail and arcuate recess and said guide wall of said second hub member includes another of an arcuate rail and arcuate recess which is cooperatively configured with the one of the arcuate rails and arcuate recess for guiding and maintaining side-by-side alignment of the first hub member and second hub member during relative pivotal movement between the first shifter and the second shifter.

13. A vehicle including an internal combustion engine, including a panel mount cable control assembly comprising:

a housing presenting opposed first and second housing halves defining an internal chamber;

a first shifter mounted for pivotal movement relative to said housing about a first pivot axis, said first shifter including a first hub member located at least partially within said internal chamber and a first lever extending from the first hub member outwardly of the internal chamber;

a second shifter mounted for pivotal movement relative to said housing about a second pivot axis, said second shifter including a second hub member located at least partially within said internal chamber and a second lever extending from the second hub member outwardly of the internal chamber;

a mounting assembly located in said internal chamber and mounting said first shifter for pivotal movement relative to said housing, said mounting assembly including a friction assembly mounted to said first housing half, said friction assembly having at least one friction element operatively connected by a bearing to at least one biasing element for inhibiting free pivoting of said first shifter and retaining the first shifter in a selected position, another of said first and second shifters being mounted to said housing separately from said friction assembly for pivoting relative to said housing; and first and second control cables respectively mounted to said first and second shifters, wherein said housing is mounted to said vehicle and said first and second control cables are operatively connected to the internal combustion engine.

14. A method of remotely controlling an internal combustion engine of a vehicle, comprising the steps of:

providing a vehicle having a control panel, an internal combustion engine and a panel mount cable control assembly which is operatively connected to the internal combustion engine by a first and second control cables, the panel mount cable control assembly including a housing carrying first and second shifters mounted for side by side pivotal movement relative to the housing about a common axis, the first shifter being operatively connected to a mounting assembly mounted within the housing, the mounting assembly including a friction applying member for holding the first shifter in a selected shifted position, and a return spring operatively connecting the housing and the second shifter for biasing the second shifter to a primary position for free-return movement when released;

shifting the first shifter to a desired position within a range of pivotal movement of the first shifter to thereby change a throttle setting of the internal combustion engine;

shifting the second shifter from the primary position to an alternative position for changing a choke setting of the internal combustion engine; and releasing the second shifter whereby the return spring automatically returns the second shifter from the alternative position to the primary position without altering the throttle setting determined by the first shifter.

15. A panel mount cable control assembly comprising:

a housing presenting an internal chamber, said housing including first and second housing halves each including an inwardly-projecting arcuate shaped lip, and at least one of said first and second housing halves including a spring mounting member;

a shifter pivotally mounted to said housing, said shifter including a lever projecting outwardly from the housing and a hub including an arcuate guide wall complementally configured with said lip for pivotal movement therealong, said hub further including a mount and structure adapted for coupling one end of a control cable thereto; and a spring positioned within said housing and operatively connecting said housing and said shifter, wherein said spring is mounted to said spring mounting member of said housing and said mount of said hub, and wherein said hub is biased to a first position by said spring, and wherein pivoting of said shifter from said first position loads said spring and wherein said spring is operable to pivotally return said shifter to said first position upon manual release of said shifter.

16. A panel mount cable control assembly as set forth in claim 15, wherein said at least one of said first and second housing halves including a spindle projecting into said chamber and pivotally mounting said shifter thereon.

17. A panel mount cable control assembly comprising:

a housing presenting an internal chamber, said housing including first and second housing halves each including an inwardly-projecting arcuate shaped lip;

a shifter pivotally mounted to said housing for movement about a pivot axis, said shifter including a lever projecting outwardly of the housing and a hub including an arcuate guide wall complementally configured with said lip for pivotal movement therealong, said shifter further including a wall having at least one recess therein and structure adapted for coupling to one end of a control cable; and a mounting assembly including a shifter mount plate in engagement with said recess of said shifter whereby pivotal movement of said shifter causes corresponding pivotal movement of said shifter mount plate, said mounting assembly further comprising at least one friction element and a biasing member operatively connected to said shifter mount plate for causing said friction member to resist pivoting movement of said shifter mount plate.

18. A panel mount cable control assembly as set forth in claim 17, wherein at least one of said housing halves includes a wall presenting a structure defining a recess thereon, and wherein said mounting assembly includes a shifter key positioned in engagement with the recess of said wall whereby said recess resists rotational movement of said shifter key relative to said housing, wherein said at least one friction element is positioned between said shifter mount plate and said shifter key, and wherein said biasing member exerts a biasing force parallel to said pivot axis, said friction element being positioned between said shifter key and said shifter mount plate.

* * * * *